United States Patent [19]

Deschenes

[11] 3,884,532

[45] May 20, 1975

[54] VEHICLE LOAD-WEIGHING APPARATUS AND VALVE MEANS OPERABLE RESPONSIVELY THERETO

[75] Inventor: Roger Deschênes, Montfermeil, France

[73] Assignee: WABCO Westinghouse GmbH, Freinville-Sevran, France

[22] Filed: July 10, 1974

[21] Appl. No.: 487,128

[52] U.S. Cl. .............................. 303/22 R; 188/195

[51] Int. Cl. ............................................... B60t 8/22

[58] Field of Search ......... 188/195; 303/22 R, 22 A, 303/23 R, 23 A, 24 R

[56] References Cited

UNITED STATES PATENTS

| | | | |
|---|---|---|---|
| 2,575,943 | 11/1951 | Cook et al. | 303/22 R |
| 2,720,429 | 10/1955 | Newell | 303/22 R |
| 3,749,452 | 7/1973 | Deschenes | 303/22 R |

*Primary Examiner*—Duane A. Reger
*Attorney, Agent, or Firm*—R. W. McIntire, Jr.

[57] ABSTRACT

Apparatus for weighing the load supported by a vehicle suspension spring and transmitting a force proportional to such load through piston means to valve means for causing the valve means to control fluid pressure in accordance with the force transmitted through said piston means, said apparatus including means for limiting the force transmitted to the piston to an axial force only and eliminating any lateral forces acting on the piston which could cause the piston to bind during movement thereof.

12 Claims, 4 Drawing Figures

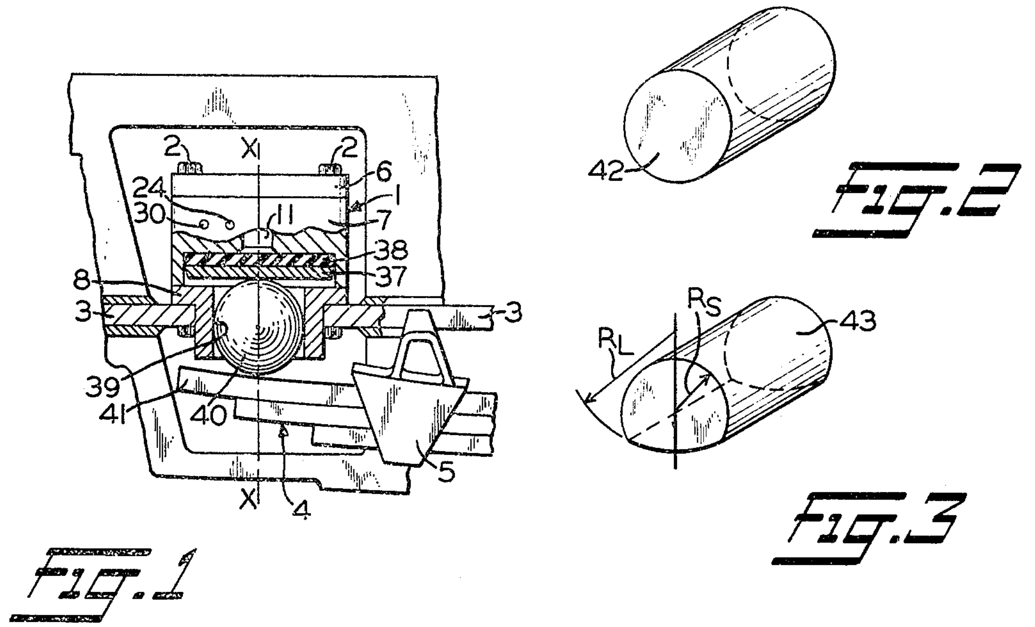
Fig. 1
Fig. 2
Fig. 3
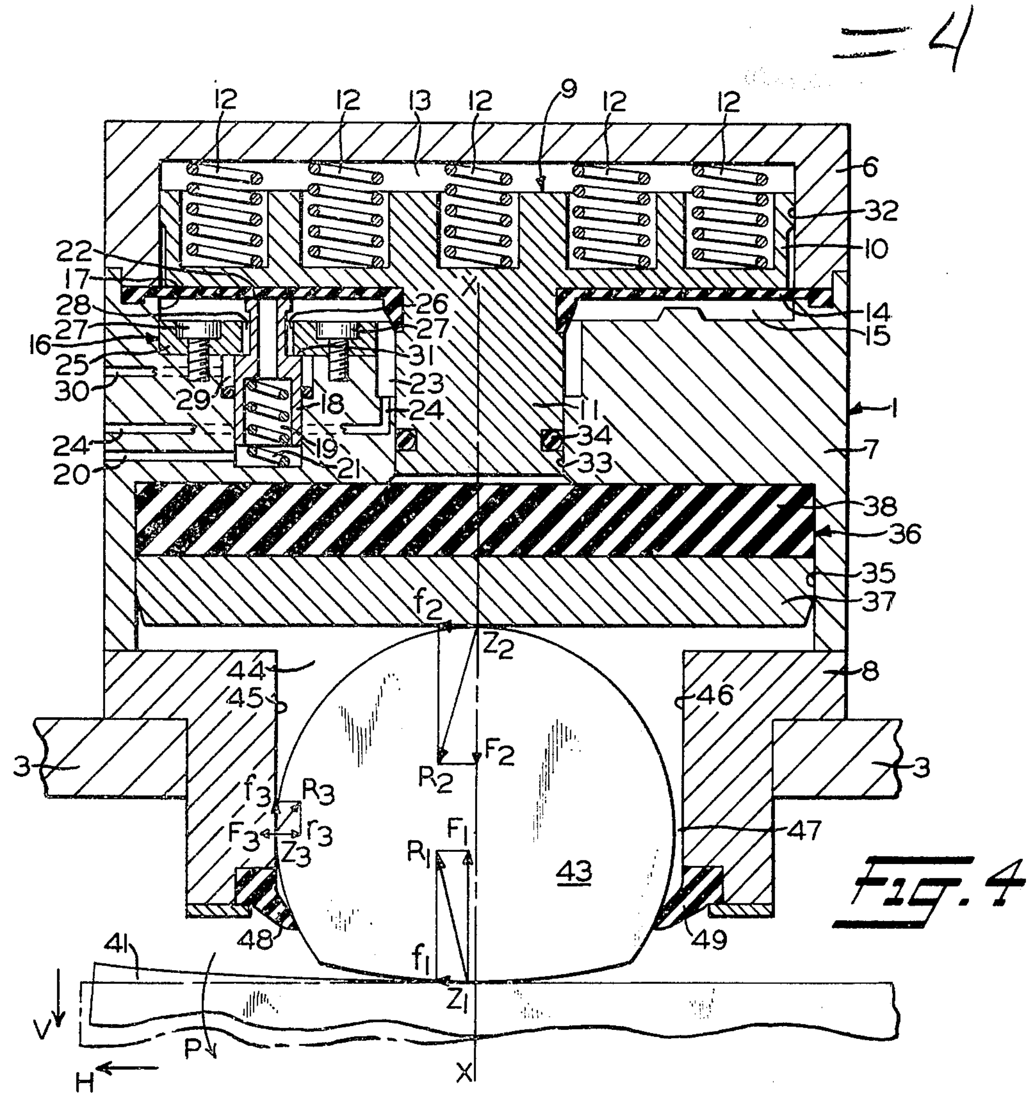
Fig. 4

VEHICLE LOAD-WEIGHING APPARATUS AND VALVE MEANS OPERABLE RESPONSIVELY THERETO

BACKGROUND OF THE INVENTION

Presently known load-weighing devices of the above-mentioned type for regulating brake control pressure in accordance with the load, when used with coil type suspension springs, are interposed between a plate fixed to the top of the coil spring and a rigid force-transmitting piston for effecting operation of the regulating valve device, said valve device being rigidly mounted on the vehicle frame. A semiball and socket connection is interposed between the plate and the piston to provide sufficient flexibility for preventing binding of the operating piston when the force transmitted thereto from the spring is transmitted in an angled direction relative to the axis of the piston.

When load-weighing devices of the above-mentioned type are used with vehicles equipped with leaf type springs, however, additional problems are presented. The load-weighing device, in this case, must be supported at the free end of the top leaf of the spring. Since the leaf of the spring moves longitudinally relative to the frame of the vehicle, as well as vertically, when the load is varied, the load-weighing device cannot be rigidly fixed to the spring leaf, but must be arranged so as to compensate for the longitudinal movement of the spring leaf in order that the force from the spring acting on the force-transmitting piston acts in a direction coinciding, as nearly as possible, with the axis of said piston to prevent any cocking or binding thereof in its guide bore.

SUMMARY OF THE INVENTION

The object of the present invention, therefore, is to provide a load-weighing device for exerting a normally directed actuating force, free of any lateral components and commensurate with the prevailing vehicle load, on a force-transmitting piston which, in turn, operates a regulating valve for effecting supply or release of control fluid pressure in accordance with the vehicle load.

Briefly, the invention, which is intended primarily for use on vehicles equipped with leaf type suspension springs, comprises a regulating valve device fixed to a portion of the vehicle frame directly over the free end of the top leaf of the spring for controlling the degree of control fluid pressure to a fluid pressure operable device, said regulating valve device including a force-transmitting piston through which a proportionally reduced operating force generated by the spring is transmitted to the valve mechanism of the regulating valve device for controlling the degree of control pressure prevailing at the fluid pressure operable device according to the prevailing vehicle load as reflected by the degree of deflection of the leaf spring. In accordance with the invention, a self-centering member, through which the operating force is transferred from the spring to the force-transmitting piston, is interposed between the oppositely facing surfaces of the leaf spring and the force-transmitting piston, said self-centering member being spherical or substantially cylindrical in form, being loosely disposed within a compatible guide recess, and being free to adjustably position itself relative to the longitudinal movement of the spring leaf so that the force transmitted from the spring leaf to the force-transmitting piston is a normally directed force relative to the axis of movement of the piston free of lateral component forces which could cause binding of the piston in its guide bore.

In the drawing,

FIG. 1 is a diagrammatic view, partly in section, showing the disposition of the device embodying the invention when mounted on a vehicle;

FIGS. 2 and 3 are perspective views of alternatively shaped components of the device shown in FIG. 1; and FIG. 4 is a sectional view, on a larger scale, of a portion of the device shown in FIG. 1.

DESCRIPTION AND OPERATION

In FIG. 1 a fluid pressure regulating valve device 1 is shown removably secured, by a plurality of bolts 2, to a vehicle frame 3, only a portion of which is shown, of a vehicle equipped with a leaf type suspension spring 4, the free end of which is supported and free to move longitudinally in a spring hanger 5 suspended from the frame 3. Spring hanger 5 also serves to hold the several leaves of spring 4 in lateral position relative to each other and to frame 3.

As best seen in FIG. 4, regulating valve device 1 comprises a casing having an upper section 6, an intermediate section 7, and a lower section 8. A stepped operating piston 9 comprises a larger diameter primary piston 10 coaxially accommodated in upper casing portion 6 and formed integrally with a smaller diameter secondary piston 11 coaxially operably disposed in casing section 7. A plurality of springs 12 disposed in a spring chamber 13 formed in upper casing section 6 and in which the larger diameter portion 10 of operating piston 9 is also operably disposed, exert a downwardly directed force, as viewed in FIG. 4, on said operating piston. A diaphragm 14, which separates spring chamber 13 from a valve chamber 15 formed in intermediate casing section 7, has an outer periphery thereof sealingly clamped between upper and intermediate casing sections 6 and 7, respectively, and an inner periphery of a central opening sealingly secured around the junction of the smaller diameter piston 11 of operating piston 9 with the larger diameter piston 10, said diaphragm thus lying against the bottom of said larger diameter piston to cooperate therewith in a manner to be hereinafter disclosed.

A valve unit 16 of the self-lapping type is disposed in a three-diameter, stepped bore 17 formed in valve chamber 14 in intermediate casing section 7, said valve unit comprising a vertically disposed supply-exhaust valve member 18 having a coaxial passageway or exhaust chamber 19 extending therethrough and opening to atmosphere via an atmospheric passageway 20 formed in the casing, and also having compressedly disposed in an enlarged portion of said passageway a spring 21 for urging said valve member upwardly, as viewed in FIG. 4, into contact with diaphragm 14. The upper end of supply-exhaust valve member 18 forms an annular exhaust valve 22 which, when in a seated position on diaphragm 14, cuts off venting of valve chamber 15 and a fluid pressure delivery chamber 23 opening to said valve chamber and connectable to a fluid pressure operable device (not shown) via a delivery passageway 24 formed in casing section 7.

A circular valve seat member 25 having a central opening 26 is secured by screws 27 to the bottom of the largest diameter portion of bore 17 in surrounding relation to the supply-exhaust valve member 18, said central opening providing an annular radial clearance 28 between the central opening of the valve seat member and said supply-exhaust valve member. Directly underneath valve seat member 25, a fluid pressure supply chamber 29 is formed cooperatively by the under side of said valve seat member, supply-exhaust valve member 18, and the intermediate diameter portion of stepped bore 17 in surrounding relation to said supply-exhaust valve member, said supply chamber being connectable to a source of fluid pressure (not shown) via a passageway 30 formed in intermediate casing section 7. An externally formed shoulder or supply valve 31 on supply-exhaust valve member 18 is seatable on the portion of the underside area of valve seat member 25 surrounding central opening 26 to cut off supply chamber 29 from valve chamber 15 and delivery chamber 23.

Upper casing section 6 is provided with a bore 32 in which primary piston 10 is operably disposed, while intermediate casing section 7 is provided with a bore 33 substantially smaller than bore 32 for operably accommodating secondary piston 11. An O-ring 34 carried by secondary piston 11 prevents leakage of fluid pressure therepast from delivery chamber 23.

Intermediate casing section 7 is also provided with a bore 35 in axial alignment with bores 32 and 33 but of substantially larger diameter than bore 33 for accommodating a force-transmitting piston 36. Force-transmitting piston 36 comprises a lower rigid circular contact plate 37, as viewed in FIGS. 1 and 4, on which an upwardly directed force is applied in a manner to be hereinafter disclosed, and an upper force-reducing circular transfer disc 38 through which a fraction of the force applied to said contact plate is transferred to secondary piston 11. Transfer disc 38 is made of a resilient material such as silicone rubber, for example, to impart thereto a degree of viscosity which permits sufficient distortion or flow of the disc into bore 33 and contact with the lower end of secondary piston 11 by an area of said transfer disc equivalent to that of the adjacent side of secondary piston 11. The lower end of bore 33 is beveled to eliminate any sharp edge which might cut or damage transfer disc 38. The lower periphery of contact plate 37 is also beveled to assist in preventing wedging of said plate in bore 35.

According to the invention, lower casing section 8, as viewed in FIG. 1, is provided with a coaxially disposed guide bore or recess 39 extending vertically therethrough. A ball shaped or spherical self-centering member 40 is disposed in guide bore 39 with a sufficient degree of clearance between itself and the cylindrical wall of the guide bore to permit free rolling of said self-centering member in the bore. Normally, the top of the self-centering member 40 is in contact with contact plate 37, while the bottom is in contact with leaf spring 4. Thus, since the force exerted on the bottom of self-centering member 40 by leaf spring 4 is in a direction normal to the surface of a top leaf 41 of said leaf spring, the direction of said force, relative to the vertical axis of said self-centering device and force-transmitting piston 36 and designated X—X in the drawing, is determined by the prevailing vehicle load and, therefore, the angle of deflection of said top leaf of the spring. The resultant force finally transmitted to force-transmitting piston 36 at the point of contanct with self-centering member 40, as will be more fully explained hereinafter, is in a direction substantially parallel to axis X—X and, therefore, has little or no tendency to cause said force-transmitting piston to bind in bore 35.

Although a spherically or ball shaped self-centering member, such as member 40, produces very effective results in carrying out the objects of the invention, it may be less desirable than some other shape, as will later be identified, in that the contact with leaf spring 4 is a single contact point where the stress of force pressures is concentrated and, therefore, the ball shaped member may wear more rapidly at said point of contact and have to be replaced more frequently. To this end, a cylindrical shape such as that of a self-centering member 42 shown in FIG. 2, may be used, in which case the contact of said self-centering member would comprise a line of contact corresponding to the width of top leaf 41 of leaf spring 4 since said self-centering member is disposed perpendicularly to said top leaf. Thus, the stress of contact pressures would be more greatly distributed than in the case of member 40.

To provide even a greater distribution of contact pressure stresses, a self-centering member 43 having a shape as shown in FIG. 3, may be employed. The cylindrical surface of the upper portion of member 43 is generated by a radius $R_S$ while the cylindrical surface of the lower portion of member 43 is generated by a radius $R_L$ greater than radius $R_S$, said portion of self-centering member 43 generated by larger radius $R_L$ thus providing a greater diffusion of stress produced by contact pressure than that provided in self-centering members 40 and 42 without losing the advantage of a curved surface at the contact zone.

If either of the cylindrically shaped self-centering members 42 or 43 is used in the invention, a guide recess 44 must, by necessity, be a channel of rectangular cross-section disposed perpendicularly to leaf spring 4 and having vertically oppositely facing rectangular side surfaces or walls 45 and 46, as shown in FIG. 4, with self-centering member 43 shown disposed therein. The width of guide recess or channel 44 is such as to provide a sufficient clearance, as shown at 47 in FIG. 4, between the self-centering member and one or the other of side walls 45 or 46, depending upon which wall the self-centering member is in contact with.

In considering the operation of the load-weighing apparatus embodying the invention, it may be assumed that angle of disposition, as seen in FIG. 4, of top leaf 41 of leaf spring 4 relative to axis X—X reflects the deflection of said leaf spring caused by the vehicle when half loaded.

Let it also be assumed that supply chamber 29, valve chamber 15, and delivery chamber 23 are all charged with fluid pressure at a predetermined degree necessary for the device (not shown) connected to delivery passageway 24 functions compatibly with a half-loaded vehicle. Exhaust-supply valve member 18 is in a lap position, in which it is shown. Self-centering member 43, therefore, is subjected, at a contact zone $Z_1$ where said self-centering device makes contact with top leaf 41, to a force $F_1$ normal to the surface of said leaf but slightly askew of axis X—X since the point of contact at $Z_1$, due to the deflection of top leaf off the normal, does not lie on said axis. Self-centering member 43 is also subjected at zone $Z_1$ to a reactive frictional force $f_1$, so that the two forces $F_1$ and $f_1$ produce a resultant force $R_1$. Self-centering device 43 is also subjected, at a contact zone $Z_2$ where said self-centering device makes contact with contact plate 37, to a reactive force $F_2$ normal to said contact plate, which direction coincides with axis X—X. Since a reactive frictional force $f_2$ is present also at zone $Z_2$, the two forces $F_2$ and $f_2$ produce a resultant force $R_2$.

Because of the direction of force $R_1$, said force acts as a pivoting torque tending to rotate self-centering member 43 in a counterclockwise direction about its contact at zone $Z_2$, thereby establishing, at a contact zone $Z_3$ where said self-centering device is forced into contact with side wall 45, a force $F_3$ and a reaction force $r_3$ normal to said side wall. A reactive frictional force $f_3$ at zone $Z_3$ acting with force $F_3$ produce a resultant force $R_3$, which also acts as a pivoting torque. Force $R_3$ is completely neutralized by resultant force $R_2$, while force $F_3$ is neutralized by reaction force $r_3$. With neutralization of lateral force $F_3$ and resultant force $R_3$, and with force $F_1$ acting substantially in a direction parallel and in proximity to the plane of axis X—X, the force thus exerted on force-transmitting piston 36 is substantially normal thereto and free of lateral effects, so that any tendency to wedge or bind said force-transmitting piston in bore 35 is negligible.

When the load supported by leaf spring 4 changes, as, for example when the load is increased, said spring assumes a more nearly horizontal disposition. In assuming such a horizontal disposition, the end of spring 4 and, therefore top leaf 41 are rotated in a counterclockwise direction, is indicated by arrow P in FIG. 4, and thereby the end of top leaf 41, in effect, moves both horizontally and vertically relative to frame 3 in the directions indicated by arrows H and V, respectively, to assume the horizontal position indicated in broken outline in FIG. 4. As a result of such movement, top leaf 41 assumes a more normal position relative to axis X—X, so that contact zone $Z_1$ in effect, assumes a position closer to axis X—X. During such positional adjustment of self-centering member 43 relative to spring leaf 41, said member is pivoted counterclockwise about its contact at zone $Z_2$, the position of which contact remains unchanged relative to axis X—X, so that the side of said self-centering member adjacent wall 45 slides along said wall during such pivoting movement thereof. In the manner just described, self-centering member 43 adjusts to any dynamic variations of vehicle load to assure that the forces transmitted to force-transmitting piston 36 act substantially normally thereto. As leaf spring 4 moves downwardly due to the increased vehicle load, frame 3 and valve device 1 follow such downward movement, and force $F_1$ is increased accordingly.

The principles of operation relating to self-centering member 43, as above described, are also applicable to self-centering members 40 and 42 shown in FIGS. 1 and 2, respectively.

When the increased force $F_1$ is transferred through self-centering member 43 to force-transmitting piston 36, such force is distributed evenly by contact plate 37 to transfer disc 38. Since, as previously noted, transfer disc 38 possesses qualities of viscosity, only a portion thereof flows into bore 33 to act on the lower surface of secondary piston 11. Consequently, the portion of force $F_1$ transmitted from force-transmitting piston 36 to secondary piston 11 for causing upward movement thereof, as well as upward movement of primary piston 10, is equivalent to the ratio of the lower area of said secondary piston to the total upper area of transfer disc 38. With upward movement of primary piston 10, diaphragm 14 is lifted off exhaust valve 22, thereby allowing relief of fluid pressure from valve chamber 15, delivery chamber 23, and consequently from the device (not shown) connected to delivery passageway 24 when fluid pressure in valve chamber 15 has been reduced sufficiently for rendering springs 12 effective for overcoming the combined efforts of force $F_1$ and the reduced pressure in valve chamber 15 acting on the bottom area of primary piston 10, primary piston 10 is moved downwardly until diaphragm 14 is seated on exhaust valve 22 to cut off further venting of fluid pressure. Thereafter, self-lapping valve unit 16 operates in valve chamber 15 and delivery chamber 23 at the level called for by the prevailing load.

Although valve unit 16, as arranged and described herein, functions as a relief valve, it should be obvious to one skilled in the art that valve unit 16 could be made to function as a supply valve by reversing the connections to passageways 20 and 30.

In order to maintain contact of any one of the self-centering members, such as member 43, for example, with contact plate 37 should leaf 41 of spring 4 lose contact with the self-centering member, a pair of protruding lips 48 and 49 made of a resilient material such as silicone rubber, for example, may be secured along the bottom edges of side walls 45 and 46, respectively. Lips 48 and 49 project away from walls 45 and 46 into recess 44 to make longitudinal contact along the opposite sides of self-centering member 43 for supporting said self-centering member in its upper position in contact with plate 37. In the case of the spherically shaped member 40, a ring shaped or annular protruding support lip (not shown) could be fixed in surrounding relation to the bottom opening of cylindrical recess or bore 39.

Having now described the invention what I claim as new and desire to secure by Letters Patent, is:

1. Vehicle load responsive apparatus for use with a leaf type suspension spring supporting the vehicle frame, said apparatus comprising:

a. a leaf type spring supporting the vehicle load and deflectible to a degree corresponding to vehicle load;

b. a regulating valve device fixed on the vehicle frame and including valve means for regulating the pressure of an operating control fluid according to vehicle load;

c. operating means subject to a biasing force of predetermined magnitude acting thereon in a first direction and to a variable force exerted thereon by said leaf spring in a second direction opposite to said first direction and of a magnitude determined by the prevailing vehicle load, said operating means being responsive to a differential force between said biasing force and said variable force for effecting operation of said valve means to establish the pressure of said control fluid at a degree corresponding to said differential force; and d. a self-centering member accommodated in a guide recess formed in said valve device, interposed between said spring and said operating means, and having a first convex surface in contact with the operating means and a second convex surface in contact with the spring at substantially diametrally opposite contact zones for transmitting said variable force from said spring to said operating means in a direction substantially normal to said spring and said operating means at said contact zones.

2. Vehicle load responsive apparatus, as set forth in claim 1, wherein said guide recess is in the form of a cylindrical bore having its axis disposed vertically perpendicular to the vehicle frame, and said self-centering member is of spherical form.

3. Vehicle load responsive apparatus, as set forth in claim 1, wherein said guide recess is in the form of a channel having a rectangular cross section and its axis disposed horizontally parallel to the vehicle frame and perpendicular to the spring, and said self-centering member is of cylindrical form and disposed coaxially in said channel.

4. Vehicle load responsive apparatus, as set forth in claim 1, wherein said guide recess is in the form of a channel having a rectangular cross section and its axis disposed horizontally parallel to the vehicle frame and perpendicular to the spring, and said self-centering member is substantially cylindrical in form with said second convex surface being generated by a cylindrical surface of greater radius than the radius of the cylindrical surface comprising the first convex surface.

5. Vechicle load responsive apparatus, as set forth in claim 1, wherein said self-centering member is also characterized by lateral convex surfaces formed on opposite sides thereof, one or the other of said lateral convex surfaces resting against the respective adjacent side wall of the guide recess depending upon the angle of deflection of said spring relative to an axis coinciding with said first direction, the dimension of said self-centering member being less than the distance between the opposite side walls of the guide recess.

6. Vehicle load responsive apparatus, as set forth in claim 1, further characterized by retaining means for retaining said self-centering member in said guide bore in the event of loss of contact between said self-centering member and said spring.

7. Vehicle load responsive apparatus, as set forth in claim 1, wherein said operating means comprises:

a. an operating piston operably disposed in said valve device and subject to said biasing force on one side and to said variable force on an opposite side; and b. a force-transmitting piston operably disposed in a piston bore in said valve device between said operating piston and said self-centering member for transmitting said variable force from said self-centering member to said operating piston, c. said force-transmitting piston comprising:

i. a rigid contact plate portion having contact on one side with said self-centering member and coaxially reciprocably operable in said piston bore, and ii. a resilient viscous transfer disc coinciding in diameter with and confined in said piston bore on the other side of said contact plate opposite said self-centering member and making contact with said opposite side of said operating piston for transferring thereto a portion of said variable force equivalent to the ratio of the contact area between said transfer disc and said opposite side of said operating piston to the area determined by the diameter of said piston bore.

8. Vehicle load responsive apparatus, as set forth in claim 7, wherein the diameter of said opposite side of said operating piston is smaller than said diameter of said piston bore.

9. Vehicle load responsive apparatus, as set forth in claim 7, wherein said rigid contact plate is provided with a peripheral beveled edge surrounding said one side.

10. Vehicle load responsive apparatus, as set forth in claim 1, wherein said second convex surface of said self-centering device makes contact with a flat surface of the adjacent leaf of said leaf spring.

11. Vehicle load responsive apparatus, as set forth in claim 2, wherein the second convex surface of the spherically formed self-centering member makes contact with a flat surface of the adjacent leaf of the leaf spring, and the contact zone thereof comprises a point on said surface.

12. Vehicle load responsive apparatus, as set forth in claim 3, wherein the second convex surface of the cylindrically formed self-centering member makes contact with a flat surface of the adjacent leaf of the leaf spring, and the contact zone thereof comprises a line perpendicular to the longitudinal axis of said adjacent leaf.

* * * * *

UNITED STATES PATENT AND TRADEMARK OFFICE

CERTIFICATE OF CORRECTION

PATENT NO. : 3,884,532

DATED : May 20, 1975

INVENTOR(S) : Rcger Deschenes

It is certified that error appears in the above-identified patent and that said Letters Patent are hereby corrected as shown below:

Item [73] Assignee: change "WABCO Westinghouse GmbH" to --WABCO Westinghouse--

Signed and Sealed this

Eighteenth Day of January 1977

[SEAL]

Attest:

RUTH C. MASON
*Attesting Officer*

C. MARSHALL DANN
*Commissioner of Patents and Trademarks*